(12) United States Patent
Li et al.

(10) Patent No.: US 11,892,577 B2
(45) Date of Patent: Feb. 6, 2024

(54) MULTI-SCALE PHOTOACOUSTIC DETECTION METHOD OF GEOLOGICAL STRUCTURE AROUND BOREHOLE AND RELATED DEVICES

(71) Applicants: Institute of Rock and Soil Mechanics, Chinese Academy of Sciences, Wuhan (CN); WUHAN CHANGSHENG MINE SECURITY TECHNOLOGY LIMITED, Wuhan (CN)

(72) Inventors: Shaojun Li, Wuhan (CN); Liu Liu, Wuhan (CN); Quan Jiang, Wuhan (CN); Fengjuan Tao, Wuhan (CN); Chunsheng Liu, Wuhan (CN)

(73) Assignees: Institute of Rock and Soil Mechanics, Chinese Academy of Sciences, Wuhan (CN); WUHAN CHANGSHENG MINE SECURITY TECHNOLOGY LIMITED, Wuhan (CN)

( * ) Notice: Subject to any disclaimer, the term of this patent is extended or adjusted under 35 U.S.C. 154(b) by 383 days.

(21) Appl. No.: 17/492,580

(22) Filed: Oct. 2, 2021

(65) Prior Publication Data
US 2023/0077684 A1 Mar. 16, 2023

(30) Foreign Application Priority Data
Sep. 9, 2021 (CN) .......................... 202111057810.7

(51) Int. Cl.
*G01V 1/28* (2006.01)
*G01V 1/30* (2006.01)
*G01V 1/50* (2006.01)
(52) U.S. Cl.
CPC .............. *G01V 1/282* (2013.01); *G01V 1/301* (2013.01); *G01V 1/303* (2013.01); *G01V 1/50* (2013.01); *G01V 2210/6222* (2013.01)

(58) Field of Classification Search
CPC ........ G01V 1/282; G01V 1/301; G01V 1/303; G01V 1/50; G01V 2210/6222; G01V 11/00
See application file for complete search history.

(56) References Cited

U.S. PATENT DOCUMENTS

2012/0120763 A1   5/2012  Vu et al.
2013/0238249 A1   9/2013  Xu et al.
(Continued)

FOREIGN PATENT DOCUMENTS

CN    103737589 B  *  8/2015  .............. B25J 11/00
CN    106908835 A     6/2017
(Continued)

OTHER PUBLICATIONS

First Office Action issued in counterpart Chinese Patent Application No. 202111057810.7, dated Jun. 6, 2022.
(Continued)

*Primary Examiner* — Daniel Pihulic
(74) *Attorney, Agent, or Firm* — Westbridge IP LLC

(57) ABSTRACT

Disclosed are a multi-scale photoacoustic detection method of geological structure around a borehole and related devices. The method includes: obtaining depth information and direction information of the borehole; generating trajectory data of the borehole according to the depth information and direction information; obtaining an optical image of the geological structure around the borehole; generating a first velocity model according to the optical image and the trajectory data; obtaining low-frequency acoustic wave data and high-frequency acoustic wave data of the geological structure around the borehole; performing a full waveform inversion on the first velocity model according to the low-frequency acoustic wave data and the high-frequency acoustic wave data to obtain a second velocity
(Continued)

model; and determining the geological structure around the borehole according to the second velocity model.

19 Claims, 5 Drawing Sheets

(56) References Cited

U.S. PATENT DOCUMENTS

| | | | |
|---|---|---|---|
| 2016/0025878 A1 | 1/2016 | Shin | |
| 2016/0047924 A1 | 2/2016 | Krohn et al. | |
| 2016/0216389 A1 | 7/2016 | Hu | |
| 2017/0285194 A1 | 10/2017 | Park et al. | |
| 2019/0302292 A1 | 10/2019 | Xie et al. | |
| 2019/0369277 A1 | 12/2019 | Hu | |
| 2021/0063591 A1* | 3/2021 | Hu | G01V 1/282 |
| 2023/0077684 A1* | 3/2023 | Li | G01V 1/303 367/73 |

FOREIGN PATENT DOCUMENTS

| | | | | |
|---|---|---|---|---|
| CN | 107829724 A | * | 3/2018 | ......... E21B 47/0002 |
| CN | 111123359 A | * | 5/2020 | ............. G01V 1/306 |
| CN | 111123359 A | | 5/2020 | |
| CN | 113985492 A | * | 1/2022 | ............. G01V 1/282 |
| CN | 113985492 B | * | 2/2023 | ............. G01V 1/282 |
| MX | 2018010095 A | | 10/2019 | |
| WO | 2021142064 A1 | | 7/2021 | |

OTHER PUBLICATIONS

He et al., Velocity building by multi-scale full waveform inversion with time-domain wave equation transform, Geophysical Prospecting for Petroleum, vol. 58, No. 2, pp. 229-236, dated Mar. 31, 2019.

Zhang, The Study on Full Waveform Inversion based on Low-frequency Seismic Wavefield Reconstruction, Doctor's Thesis submitted to Jilin University, dated Jan. 15, 2019.

* cited by examiner

MULTI-SCALE PHOTOACOUSTIC DETECTION METHOD OF GEOLOGICAL STRUCTURE AROUND BOREHOLE AND RELATED DEVICES

CROSS-REFERENCE TO RELATED APPLICATIONS

The present application claims priority of Chinese Patent Application 202111057810.7, filed on Sep. 9, 2021, the entire contents of which are incorporated herein by reference.

TECHNICAL FIELD

The present disclosure relates to geological exploration technologies, and more particularly to a multi-scale photoacoustic detection method of geological structure around a borehole and related devices.

BACKGROUND

Generally, drilling is indispensable for geological explorations. However, for poor geological strata, core drillings are often difficult. Moreover, in deep rocks, core fragmentations and other problems may occur due to core caking and complex structural surfaces. In this case, high-definition digital panoramic borehole televisions are often used to image borehole walls. However, due to limitations on the space of a cross-section of a single borehole, poor geological structure around the borehole may not be detected. In order to improve detection efficiency of each borehole, new geological exploration methods and related devices which can expand a detection range of the borehole and can also provide accurate information about poor geological developments around a borehole are needed.

SUMMARY

In view of the above, examples of the present disclosure provide a multi-scale photoacoustic detection method of geological structure around a borehole and related devices.

The multi-scale photoacoustic detection method according to some examples of the present disclosure may include: obtaining depth information and direction information of a borehole; generating trajectory data of the borehole according to the depth information and direction information; obtaining an optical image of geological structure around the borehole; generating a first velocity model according to the optical image and the trajectory data; obtaining low-frequency acoustic wave data and high-frequency acoustic wave data of the geological structure around the borehole; performing a full waveform inversion on the first velocity model according to the low-frequency acoustic wave data and the high-frequency acoustic wave data to obtain a second velocity model; and determining the geological structure around the borehole according to the second velocity model.

The multi-scale photoacoustic detection device of geological structure around a borehole according to some examples of the present disclosure may include: a controller and a borehole probe; the borehole probe comprising a plurality of acoustic receiving transducers, arranged sequentially along an axial direction of the borehole probe; the controller is configured to: obtain depth information and direction information of a borehole; generate trajectory data of the borehole according to the depth information and direction information; obtain an optical image of geological structure around the borehole; generate a first velocity model of the geological structure around the borehole according to the optical image and the trajectory data; obtain low-frequency acoustic wave detection data and high-frequency acoustic wave detection data of the geological structure around the borehole; perform a full waveform inversion on the first velocity model according to the low-frequency acoustic wave detection data and the high-frequency acoustic wave detection data to obtain a second velocity model of the geological structure around the borehole; and determine the geological structure around the borehole according to the second velocity model.

Examples of the present disclosure also provide an electronic device, which includes a memory, a processor, and a computer program stored in the memory and executable on the processor, wherein the processor executes the program to implement the method photoacoustic fusion multi-scale detection of geological structure around a borehole.

Examples of the present disclosure also provide a non-transitory computer-readable storage medium, wherein the non-transitory computer-readable storage medium stores computer instructions, and the computer instructions are used to make the computer execute the multi-scale photoacoustic detection method.

It can be seen from the above description that in the above geological exploration process a photoacoustic fusion multi-scale geological exploration around a borehole can be performed. In this method, the depth information and the direction information of the borehole are obtained firstly. Moreover, the trajectory data of the borehole is generated according to the depth information and direction information. Later, an optical image of the geological structure around the borehole is obtained. Then, a first velocity model can be generated according to the optical image and the trajectory data. Further, the low-frequency acoustic wave data and the high-frequency acoustic wave data of the geological structure around the borehole are obtained. And a full waveform inversion on the first velocity model is performed according to the low-frequency acoustic wave data and the high-frequency acoustic wave data to obtain a second velocity model. Finally, the geological structure around the borehole can be determined according to the second velocity model. In this way, a multi-scale refined imaging on geological developments within a certain range around the borehole can be implemented.

BRIEF DESCRIPTION OF DRAWINGS

In order to illustrate examples of the present disclosure or the prior art more clearly, references will now be made to accompanying drawings which form a part hereof, and in which it will be apparent to those skilled in the art that the drawings described below are merely examples of the present disclosure, and that other drawings may be made without inventive effort.

DETAILED DESCRIPTION OF THE EMBODIMENTS

For a better understanding of the objects, aspects and advantages of the present disclosure, references will now be made to the following detailed description taken in conjunction with the accompanying drawings.

It should be noted that, unless defined otherwise, technical or scientific terms used in connection with examples of the present disclosure shall have ordinary meanings understood by those skilled in the art to which this disclosure belongs. As used in this disclosure, the terms "first", "second" and the like do not denote any order, quantity, or importance, but rather are used to distinguish one element from another. The word "comprise", "include" or the like means that an element or an article preceded by the word is inclusive of elements or articles listed after the word and their equivalents, however does not exclude other elements or articles. Similar terms such as "connect" is not limited to physical or mechanical connections, but may also include electrical connections, whether direct or indirect. "Above", "under", "left" and "right" are used merely to denote relative positional relationships, which may change accordingly when an absolute position of an object being described changes.

As described previously, when only a high-definition digital panoramic borehole television is used to image the borehole walls, only the borehole walls can be detected and geological structure around the borehole cannot be detected. To solve this problem, geological structure around a borehole may also be detected through acoustic wave reflections. However, while performing a geological exploration using acoustic wave reflections, there is a contradictory between a detection resolution and a detection distance. That is, a new geological exploration method with both high resolution and long detection distance is needed.

Figure 1:
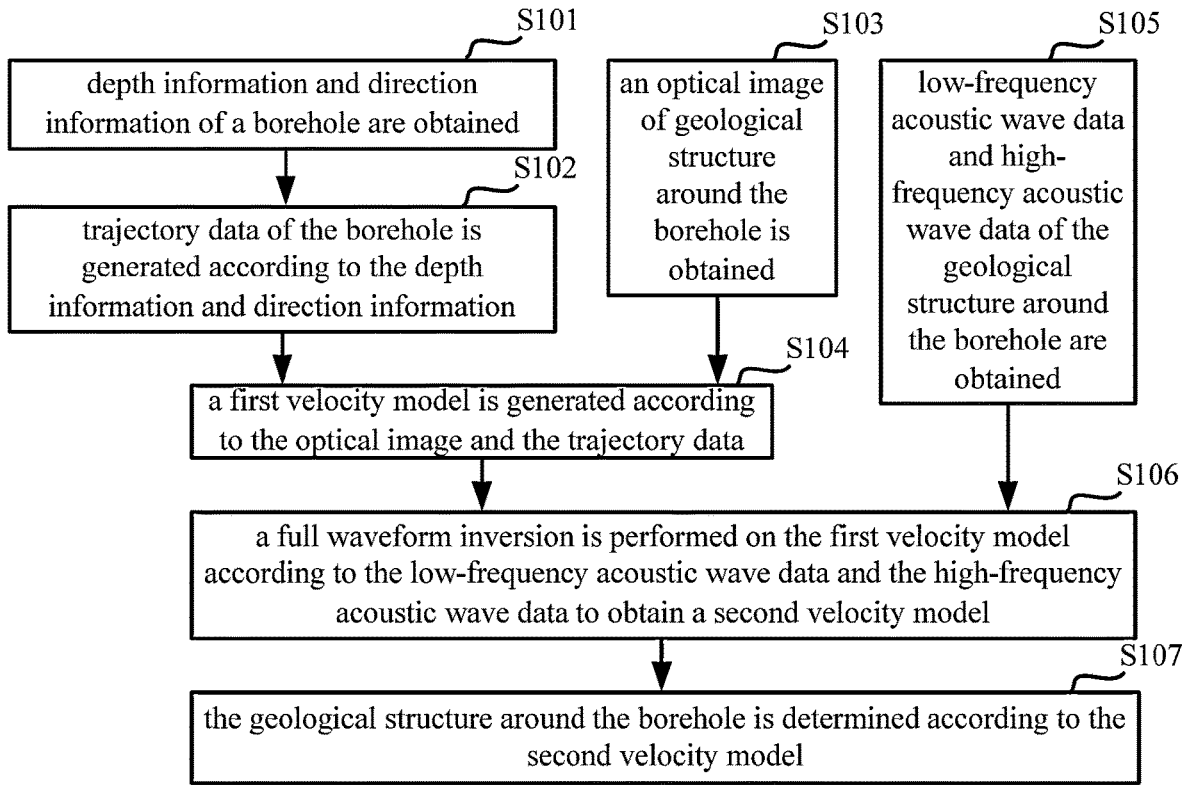
FIG. 1 is a schematic diagram illustrating a multi-scale photoacoustic detection method of geological structure around a borehole according to some examples of the present disclosure.

FIG. 1 illustrates a multi-scale photoacoustic detection method of geological structure around a borehole according to some examples of the present disclosure. According to FIG. 1, the method may include the following steps.

In S101, depth information and direction information of a borehole are obtained.

In some examples of the present disclosure, the depth information may refer to a distance of the borehole from a pre-determined horizontal plane. The direction information may refer to a deviation between the borehole and a normal line perpendicular to the pre-determined horizontal plane. Optionally, the deviation can be expressed by an angle, or can be expressed by a relative coordinate to the normal line. To be noted, expressions of the deviation should not be limited herein.

According to some examples of the present disclosure, the depth information may be measured by a depth technician. The direction information may be measured by a three-dimensional electronic compass. According to some examples of the present disclosure, the depth technician and the three-dimensional electronic compass may be arranged in a borehole detection device.

In S102, trajectory data of the borehole is generated according to the depth information and the direction information.

In some examples of the present disclosure, after obtaining the depth information and the direction information of the borehole, the trajectory data of the borehole may be generated according to the depth information and the direction information.

Optionally, the trajectory data may represent a trajectory of the borehole from the surface of the pre-determined horizontal plane towards the earth's center.

In S103, an optical image of geological structure around the borehole is obtained.

According to some examples of the present disclosure, the optical image of the geological structure around the borehole may be obtained through a high-definition camera or other camera equipment. The camera may be arranged in the borehole detection device too.

To be noted, the capture of the optical image may be performed before or after or at the same time with the measurement of the depth information and the direction information. That is, the above step S103 can be performed before, after or at the same time with the above step S101.

In S104, a first velocity model is generated according to the optical image and the trajectory data.

According to some examples of the present disclosure, the first velocity model may be used to perform a predict on the geological structure around the borehole to be detected. Specifically, the first velocity model may record estimate velocities of an acoustic wave propagating in the geological structure around a borehole. Thus, the first velocity model may indicate the geological structure around the borehole to be detected to a certain extent.

It should be noted that velocities of acoustic waves propagating in different rocks may be different due to different lithologies of the rocks. Thus, the velocity of an acoustic wave propagating at various positions in the borehole may be determined by distributions of different formations of rocks around the borehole and an integrity of any of the rocks.

In view of the above, if the first velocity model is established based on experiences, the first velocity model established may not be suitable for a specific borehole. That is because the first velocity model established based on experiences may differ a lot from a real velocity model corresponding to the geological structure of the specific borehole. In view of the above considerations, in some examples of the present disclosure, the first velocity model may be generated based on the optical image of the borehole.

Figure 2:
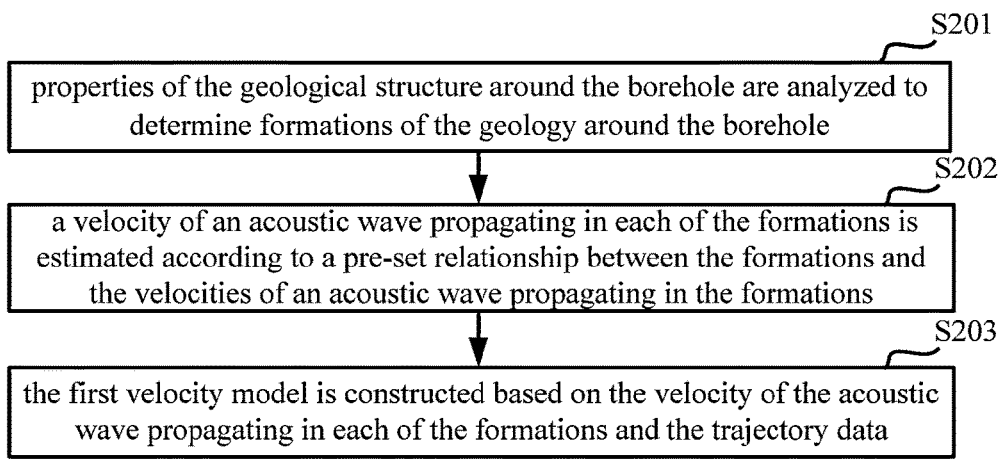
FIG. 2 illustrates a method for generating a first velocity model based on an optical image of a borehole according to some examples of the present disclosure.

Specifically, FIG. 2 illustrates a method for generating a first velocity model based on an optical image of a borehole according to some examples of the present disclosure. As shown in FIG. 2, the first velocity model may be generated by the following steps.

In S201, properties of the geological structure around the borehole, such as lithology, rock integrity, and water cut, are analyzed to determine formations of the geological structure around the borehole.

In S202, a velocity of an acoustic wave propagating in each of the formations is estimated according to a pre-set relationship between the formations and the velocities of an acoustic wave propagating in the formations.

In S203, the first velocity model corresponding to the geological structure around the borehole is constructed based on the velocity of the acoustic wave propagating in each of the formations and the trajectory data of the borehole.

In some examples of the present disclosure, the first velocity model corresponding to the geological structure around the borehole may be generated by matching the wave velocity of each of the formations with experimental detection data or historical detection data and also by combining the trajectory data. For example, in this step, a neural network model may be pre-trained based on historical detection data. Then the optical image and the trajectory data may be input into the neural network model, and the first velocity model may be output by the neural network model. The neural network may be a Convolutional Neural Network (CNN) and the like.

Specifically, in the above step of generating the first velocity model, specific properties of the rocks around the borehole can be analyzed and then the first velocity model can be constructed based on these specific properties. Moreover, while constructing the first velocity model, the trajectory data of the borehole is considered too. By combining the trajectory data and the optical image, both properties of the geological structure around the borehole and a relative position of the borehole wall in the formation can be known. In this way, the first velocity model constructed may be closer to a real velocity model corresponding to the geological structure of the borehole. Moreover, optical imaging and measurement of the trajectory data of the borehole may provide a prerequisite for the detection of horizontal and oblique boreholes.

In S105, low-frequency acoustic wave data and high-frequency acoustic wave data of the geological structure around the borehole are obtained.

In some examples of the present disclosure, the low-frequency acoustic wave data and the high-frequency acoustic wave data can be obtained by an acoustic wave transducer or an acoustic wave receiving transducer. In some examples of the present disclosure, the frequency of the low-frequency acoustic wave data may refer to 0.1 kHz-6 kHz, and the frequency of the high-frequency acoustic wave data may refer to 20 kHz-50 kHz.

In some examples of the present disclosure, a plurality of acoustic wave receiving transducers may be used to obtain the low-frequency acoustic wave data and the high-frequency acoustic wave data. In this case, an acoustic wave signal can be obtained at each point on the borehole wall. That is, various acoustic wave data with different wavelengths and offset (the distance between the acoustic wave emitting point and the acoustic wave receiving point) can be obtained. Therefore, the coverage and the density of the acoustic wave data can be improved, thereby, the acoustic wave data can reflect the nature of the geological structure around the borehole better and the detection accuracy can be improved.

It should be noted that, in the method disclosed by the present disclosure, both the high-frequency acoustic wave data and the low-frequency acoustic wave data may be obtained at a source end of the acoustic waves. In this way, benefits of a higher detection accuracy brought by the high-frequency acoustic wave data and a larger detection range brought by the low-frequency acoustic wave data can be combined. Thus, the accuracy of the detection can be ensured.

To be noted, the detection of the low-frequency acoustic wave data and the high-frequency acoustic wave data may be performed before or after or at the same time with the capture of the optical image and/or the measurement of the depth information and the direction information. That is, the above step S105 can be performed before, after or at the same time with the above step S101 or S103.

In some examples of the present disclosure, after obtaining the low-frequency acoustic wave data and the high-frequency acoustic wave data of the geological structure around the borehole, the method may further include the following step: filtering the high-frequency acoustic wave data based on the optical image.

In some examples of the present disclosure, since the detection range of the high-frequency acoustic wave data is relatively small, it may be closer to the optical image. That is, the high-frequency acoustic wave data can be filtered through the optical image. Specifically, the filtering process may include: comparing the high-frequency acoustic wave data with the optical image to identify a track set in the high-frequency acoustic wave data which is obviously inconsistent with the optical image. In this example, the track set refers to a set of multi-track acoustic wave receiving signals. Then, clear the track set from the high-frequency acoustic wave data to filter out noises. In this way, the accuracy of the high-frequency sound data can be improved.

In some examples of the present disclosure, the optical image and the high-frequency acoustic wave data can be captured simultaneously. Then the high-frequency acoustic wave data is filtered based on the optical image. Moreover, only the filtered high-frequency acoustic wave data is taken as the captured high-frequency acoustic wave data for subsequent operations such as transmission, storage and calculation. In this way, the storage space of the computer can be saved.

In S106, a full waveform inversion is performed on the first velocity model according to the low-frequency acoustic wave data and the high-frequency acoustic wave data to obtain a second velocity model.

Figure 3:
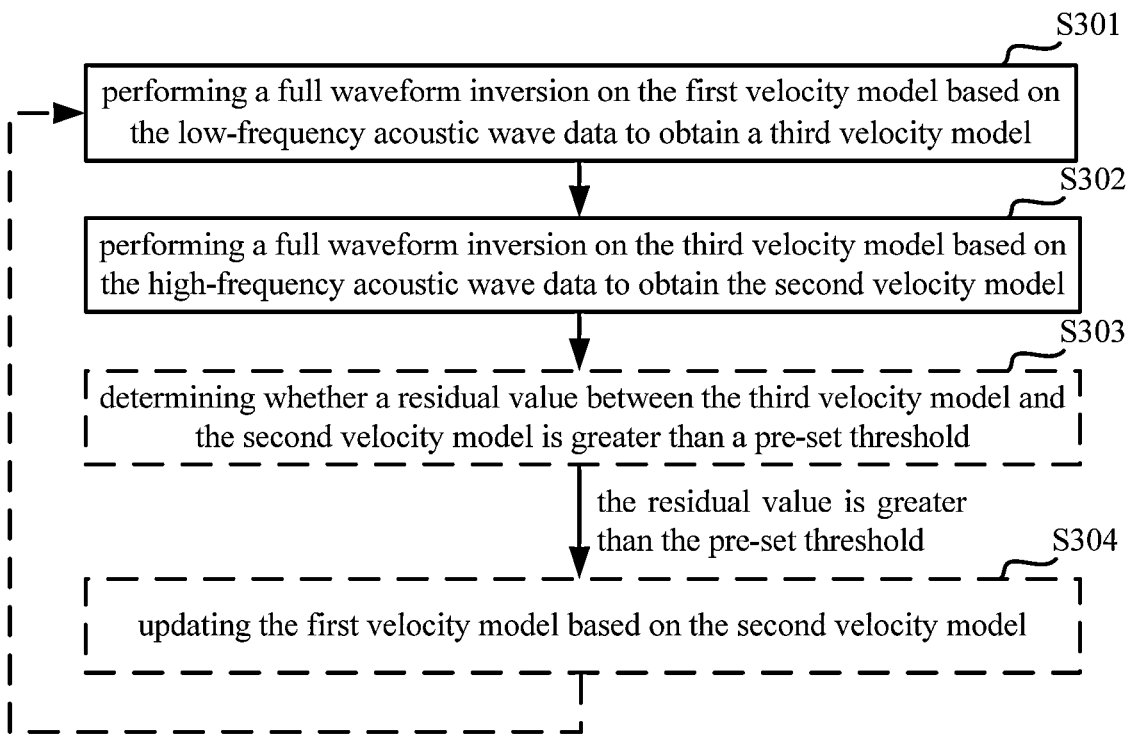
FIG. 3 illustrates a method for performing a full waveform inversion on the first velocity model according to the low-frequency acoustic wave data and the high-frequency acoustic wave data to obtain a second velocity model according to some examples of the present disclosure.

FIG. 3 illustrates a method for performing a full waveform inversion on the first velocity model according to the low-frequency acoustic wave data and the high-frequency acoustic wave data to obtain a second velocity model according to some examples of the present disclosure. As shown in FIG. 3, the second velocity model may be generated by the following steps.

In S301, performing a full waveform inversion on the first velocity model based on the low-frequency acoustic wave data to obtain a third velocity model.

In S302, performing a full waveform inversion on the third velocity model based on the high-frequency acoustic wave data to obtain the second velocity model.

As disclosed above, the first velocity model is only an estimated velocity model, and there must be a big difference between the first velocity model and a real velocity model corresponding to the geological structure around the borehole. And as one would understand, the detection range of the low-frequency acoustic wave data is large, but the precision of the data is relatively low. However, the detection range of the high-frequency acoustic wave data is small, but the precision of the data is relatively high. In this case, if the high-frequency acoustic wave data are used directly to invert the first velocity model, only a local optimal solution rather than a global optimal solution can be got. Therefore, in examples of the present disclosure, a full waveform inversion can be firstly performed on the first velocity model according to the low-frequency acoustic wave data to obtain the third velocity model corresponding to the geological structure around the borehole. Then, a full waveform inversion can be further performed on the third velocity model according to the high-frequency acoustic wave data to obtain the second velocity model. In this way, the third velocity model which is closer to the global optimal solution can be obtained based on the low-frequency acoustic wave data. After that, the global optimal solution can be further obtained based on the more precise high-frequency acoustic wave data. By this method, both the accuracy and reliability of acoustic wave inversion can be improved.

In some examples of the present disclosure, in the above step S301, by performing a full waveform inversion on the first velocity model based on the low-frequency acoustic wave data, the third velocity model corresponding to a first pre-set range of the borehole can be obtained. Wherein, the first pre-set range can be set as required. For example, the first pre-set range may be a range of less than or equal to 15 meters around the borehole. Further, in the above step S302, by performing a full waveform inversion on the third velocity model based on the high-frequency acoustic wave data, the second velocity model corresponding to a second pre-set range of the borehole is obtained. Wherein, the second pre-set range can be set as required. For example, the second pre-set range may be a range of less than or equal to 3 meters around the borehole.

To further improve the accuracy and reliability of the acoustic wave inversion, according to some examples of the present disclosure, performing a full waveform inversion on the first velocity model with the low-frequency acoustic wave data and the high-frequency acoustic wave data may further include the following step.

In S303, determining whether a residual value between the third velocity model and the second velocity model is greater than a pre-set threshold.

In response to determining that the residual value between the third velocity model and the second velocity model is greater than the pre-set threshold, proceed to S304. And in response to determining that the residual value between the third velocity model and the second velocity model is not greater than the pre-set threshold, terminating the process.

In S304, updating the first velocity model based on the second velocity model, and then return to the step S301.

In some examples of the present disclosure, since the detection range of the first velocity model is large and the detection range of the second velocity model is small, updating the first velocity model according to the second velocity model may include: replacing a portion of the first velocity model whose detection range coincides with the detection range of the second velocity model, and remaining other portions of the first velocity model unchanged.

To be noted, these steps of velocity models updates would be repeated until it is determined that the residual value between the third velocity model and the second velocity model is not greater than the pre-set threshold. In this case, the full-waveform inversion would be finished.

That is, the full waveform inversion on the first velocity model according to the low-frequency acoustic wave data and the high-frequency acoustic wave data can be a continuously cyclic process between space and frequency. Namely, a full-waveform inversion on the first velocity model according to the low-frequency acoustic wave data and a full-waveform inversion on the third velocity model according to the high-frequency acoustic wave data can be continuously repeated until the residual value of the third velocity model and the second velocity model is small. This continuously cyclic process may further improve the accuracy of the full-waveform inversion.

It should be noted that the above-mentioned process of full waveform inversions based on the low-frequency acoustic wave data in S301 may be performed for one or more times.

Figure 4:
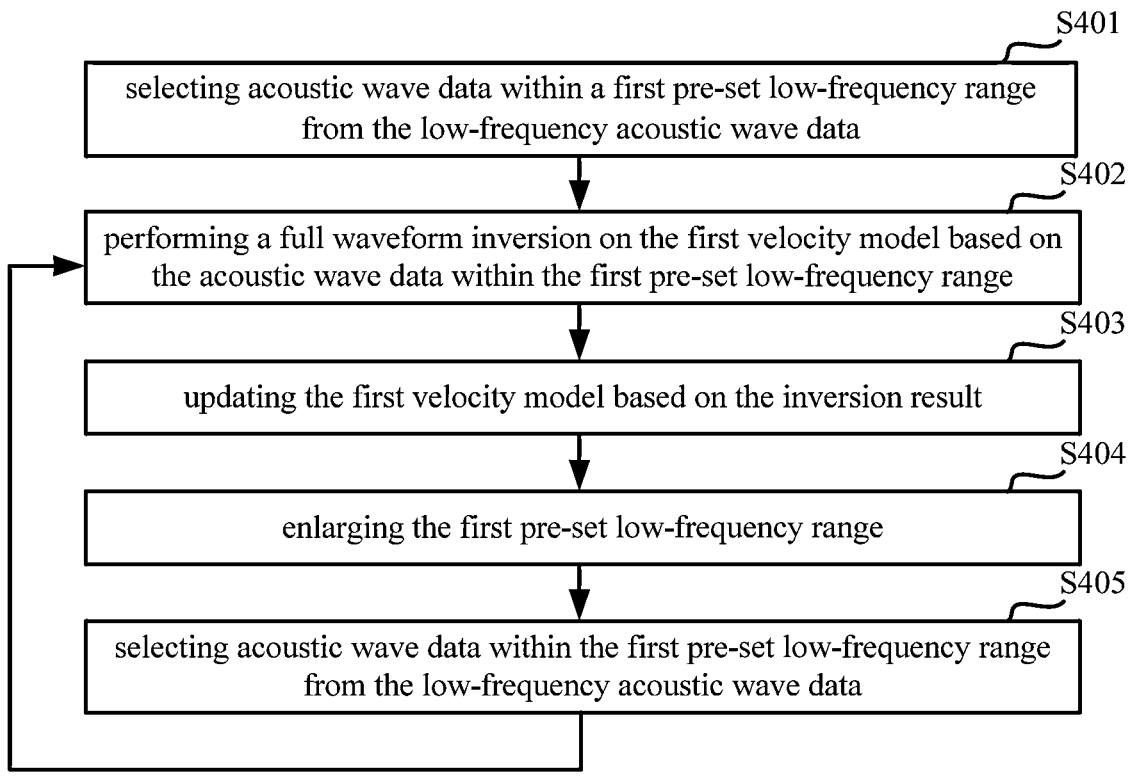
FIG. 4 illustrates a method for performing a full waveform inversion on the first velocity model based on the low-frequency acoustic wave data to obtain a third velocity model according to some examples of the present disclosure.

In some examples of the present disclosure, FIG. 4 illustrates a method for performing a full waveform inversion on the first velocity model based on the low-frequency acoustic wave data to obtain a third velocity model according to some examples of the present disclosure. As shown in FIG. 4, the method may include the following steps.

In S401, selecting acoustic wave data within a first pre-set low-frequency range from the low-frequency acoustic wave data.

In S402, performing a full waveform inversion on the first velocity model based on the acoustic wave data within the first pre-set low-frequency range.

Here, the full waveform inversion may be performed first through a preset envelope target function and then through a pre-set cross-correlation objective function as stated above.

In S403, updating the first velocity model based on the inversion result.

In S404, enlarging the first pre-set low-frequency range.

In S405, selecting acoustic wave data within the first pre-set low-frequency range from the low-frequency acoustic wave data and returning to the step S402.

In some examples of the present disclosure, the first pre-set low-frequency range can be set according to actual needs, and is not limited herein. For example, the frequency of the low-frequency acoustic wave data can be 0.1 kHz-6 kHz. In this case, the acoustic wave data with the frequency of 0.1 kHz-1 kHz can be selected from the low-frequency acoustic wave data first. Namely, the first pre-set low-frequency range at this moment can be set as 0.1 kHz-1 kHz. Then, a full waveform inversion can be performed using the acoustic wave data with the frequency of 0.1 kHz-1 kHz. Later, the first pre-set low-frequency range can be enlarged to 0.1 kHz-2 kHz. That is, the acoustic wave data with the frequency of 0.1 kHz-2 kHz may be selected. Then, a full waveform inversion can be performed using the acoustic wave data with the frequency of 0.1 kHz-2 kHz, and so on. Finally, a full waveform inversion can be performed using the acoustic wave data with the frequency of 0.1 kHz-6 kHz. It should be noted that the amplitude of the frequency range in which the sound data can be enlarged each time may be set as needed and is not limited herein.

Figure 5:
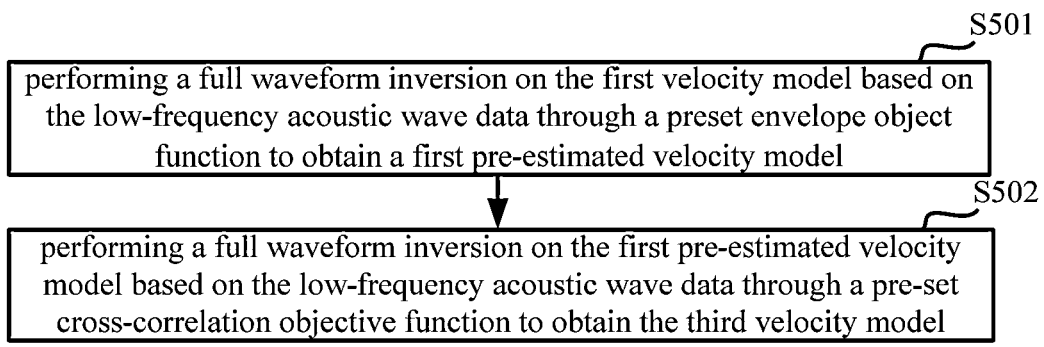
FIG. 5 illustrates a method for performing a full waveform inversion on the first velocity model based on the low-frequency acoustic wave data to obtain a third velocity model according to some other examples of the present disclosure.

In some examples of the present disclosure, FIG. 5 illustrates a method for performing a full waveform inversion on the first velocity model based on the low-frequency acoustic wave data to obtain a third velocity model according to some other examples of the present disclosure. The method can be used to implement the above step S301 and S402. As shown in FIG. 5, the method may include the following steps.

In S501, performing a full waveform inversion on the first velocity model based on the low-frequency acoustic wave data through a preset envelope object function to obtain a first pre-estimated velocity model.

Specifically, in the above step S501, an envelope of a simulated acoustic wave signal in the first velocity model is obtained at first. Then, an envelope of the low-frequency acoustic wave data is obtained. Further, the full waveform inversion on the first velocity model is performed according to the envelope of the simulated acoustic wave signal and the envelope of the low-frequency acoustic wave detection data through the preset envelope target function to obtain the first pre-estimated speed model.

In S502, performing a full waveform inversion on the first pre-estimated velocity model based on the low-frequency acoustic wave data through a pre-set cross-correlation objective function to obtain the third velocity model.

It should be noted that when performing a full waveform inversion on the first velocity model based on low or high-frequency acoustic wave data, multiple inversions can be performed using the above-described method of gradually enlarging the frequency range. This process could further improve the accuracy and reliability of the acoustic wave inversion.

In some examples of the present disclosure, the inversion can be performed using the preset envelope objective function and the preset cross-correlation objective function. To be noted, the inversion can also be performed by using other objective functions, which is not limited herein.

Figure 6:
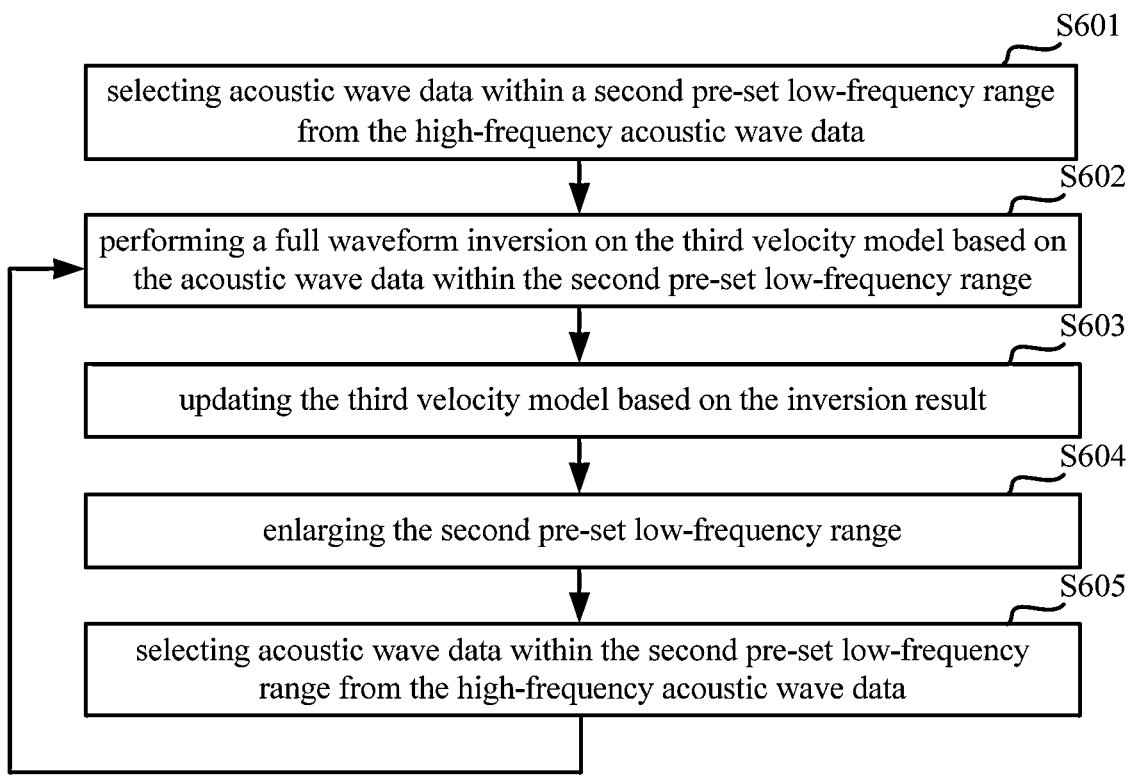
FIG. 6 illustrates a method for performing a full waveform inversion on the third velocity model based on the high-frequency acoustic wave data to obtain a second velocity model according to some examples of the present disclosure.

Similarly, in some examples of the present disclosure, FIG. 6 illustrates a method for performing a full waveform inversion on the third velocity model based on the high-frequency acoustic wave data to obtain the second velocity model. As shown in FIG. 6, the method may include the following steps.

In S601, selecting acoustic wave data within a second pre-set low-frequency range from the high-frequency acoustic wave data.

In S602, performing a full waveform inversion on the third velocity model based on the acoustic wave data within the second pre-set low-frequency range.

Here, the full waveform inversion may be performed first through the preset envelope target function and then through the pre-set cross-correlation objective function as stated above.

In S603, updating the third velocity model based on the inversion result.

In S604, enlarging the second pre-set low-frequency range.

In S605, selecting acoustic wave data within the second pre-set low-frequency range from the high-frequency acoustic wave data and returning to the step S602.

In examples of the present disclosure, the second pre-set low-frequency range can be set as needed, and is not limited herein. Moreover, other specific steps can be repeated with the above-mentioned corresponding contents of performing full waveform inversion on the first velocity model based on low-frequency acoustic wave data, as shown in FIG. 4.

Figure 7:
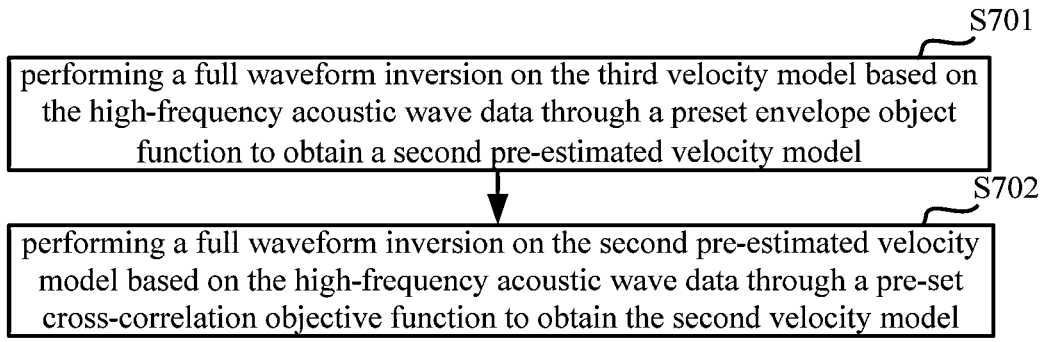
FIG. 7 illustrates a method for performing a full waveform inversion on the third velocity model based on the high-frequency acoustic wave data to obtain a second velocity model according to some other examples of the present disclosure.

In some examples of the present disclosure, FIG. 7 illustrates a method for performing a full waveform inversion on the third velocity model based on the high-frequency acoustic wave data to obtain a second velocity model. The method can be used to implement the above step S302 and S602. As shown in FIG. 7, the method may include the following steps.

In S701, performing a full waveform inversion on the third velocity model based on the high-frequency acoustic wave data through a preset envelope object function to obtain a second pre-estimated velocity model.

In S702, performing a full waveform inversion on the second pre-estimated velocity model based on the high-frequency acoustic wave data through a pre-set cross-correlation objective function to obtain the second velocity model.

To be noted, the specific process of full waveform inversion on the third velocity model based on the high-frequency acoustic wave data to obtain the second velocity model is similar to the above-mentioned process.

It should be noted that by obtaining the envelope of the acoustic wave data, the frequency of the acoustic wave data can be reduced. In this way, the inversion is equivalent to performing an inversion on the acoustic wave data which is more independent from the first velocity model thereby the stability of the inversion can be further improved.

In some examples of the present disclosure, performing a full waveform inversion on the third velocity model based on the high-frequency acoustic wave data to obtain the second velocity model may further include the following steps.

In some examples, the preset envelope objective function may be set as:

$$E = \frac{1}{2}\sum_{s,r}\int_0^T [e(x_s, x_r, t) - e_0(x_s, x_r, t)]^2 dt$$

Wherein, $e(x_s, x_r, t)$ represents the envelope of the simulated acoustic wave signal; $e_0(x_s, x_r, t)$ indicates the envelope of the low-frequency acoustic wave data or the high-frequency acoustic wave data.

In some examples, the preset cross-correlation objective function may be set as:

$$E = \sum_{s,r}\int_0^T [-\frac{u(x_s, x_r, t)}{|u(x_s, x_r, t)|} \cdot \frac{u_0(x_s, x_r, t)}{|u_0(x_s, x_r, t)|}] dt$$

Wherein, $u(x_s, x_r, t)$ represents the simulated acoustic wave signal; and $u_0(x_s, x_r, t)$ represents the low-frequency acoustic wave data or the high-frequency acoustic wave data.

In examples of the present disclosure, the simulated acoustic wave signal may be simulated signal from any one of the first velocity model, the first pre-estimated velocity model, the third velocity model, and the second pre-estimated velocity model. In examples of the present disclosure, the simulated acoustic wave signal, the low-frequency acoustic wave data and the high-frequency acoustic wave data may all include: an emission location $x_s$ of the acoustic wave in the borehole, a reception location $x_r$ of the acoustic wave in the borehole, and a propagation time of the acoustic wave.

It should be noted that other objective function can be selected as needed and is not limited by the above equation.

The second velocity model corresponding to a borehole obtained through a full waveform inversion may record almost real velocities of an acoustic wave propagating in the geological structure around the borehole. Thus, the second velocity model may be used to indicate the geological structure around the borehole to be detected.

In S107, the geological structure around the borehole is determined according to the second velocity model.

In examples of the present disclosure, after obtaining the second velocity model, the geological structure around the borehole can be determined according to the second velocity model.

Figure 8:
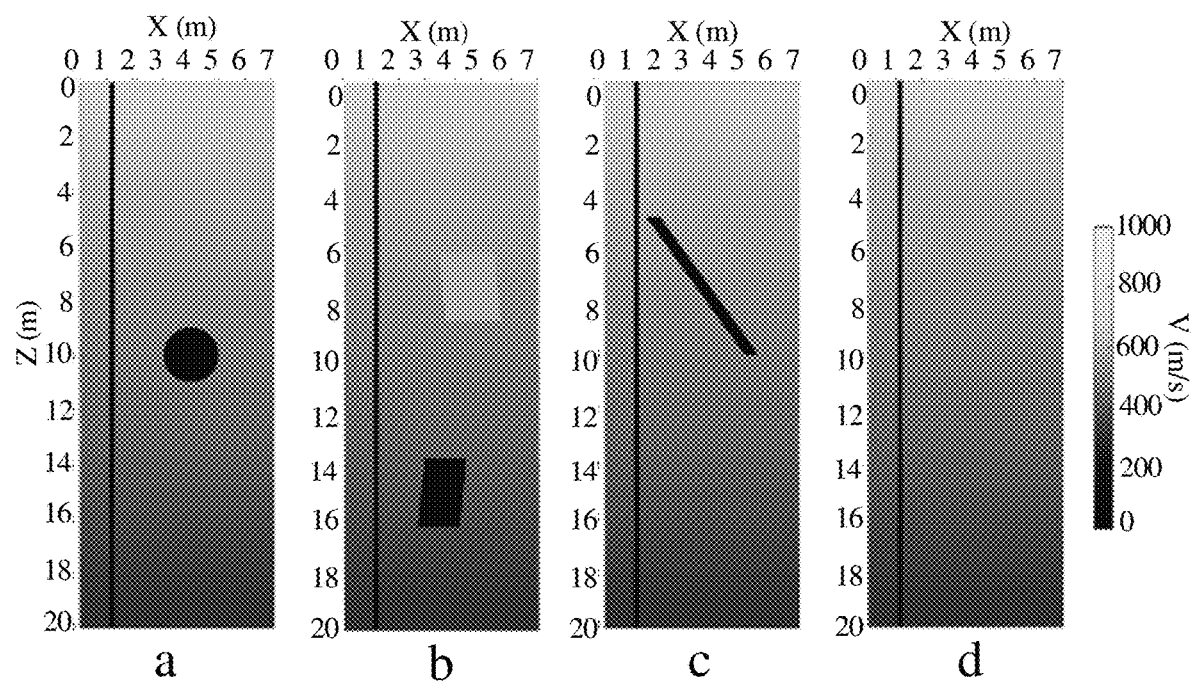
FIG. 8 is a schematic diagram illustrating visualizations of velocity models according to some examples of the present disclosure.

FIG. 8 is a schematic diagram illustrating visualizations of velocity models corresponding to the geological structure around a borehole according to some examples of the present disclosure. As shown in FIG. 8, a, b, c, and d refer to schematic views of four velocity models, respectively. In each of the schematic views, the left black vertical straight line represents a borehole, and the gray portion gradually deepened from top to bottom represents the geological structure around the borehole. Geological properties of a rock can be specifically expressed in terms of the velocity of acoustic wave propagating in the rocks. The darker the color is, the faster the propagation velocity is. Specific values can be compared with an acoustic wave velocity bar shown on the right. V represents the velocity of acoustic wave in meters per second (m/s). X represents a horizontal distance of the borehole in meters (m) and Z represents a depth of the borehole in meters (m). It can be seen that, the geological structure around a borehole can be well determined by the velocity model corresponding to the borehole.

In FIG. 8, d represents the first velocity model, and a, b, c represent target velocity models. The target velocity model is unknown during the acoustic wave inversion. It can be seen that although the first velocity model can be used for one-dimensional linear estimation along the borehole depth direction according to the optical image of the borehole, the first velocity model d is still significantly different from any of the target models. Therefore, the acoustic wave inversion based on the high-frequency acoustic wave data directly on the first velocity model d will often get only local optimal solution and have other problems, which cannot ensure the stability and accuracy of the acoustic wave inversion.

It can be seen from the above description that a photoacoustic fusion multi-scale geological exploration around a borehole can be implemented through the method disclosed. In this method, the depth information and the direction information of the borehole are obtained firstly. Then the trajectory data of the borehole is generated according to the depth information and the direction information. Later, the optical image of geological structure around the borehole is obtained. Then, the first velocity model of the geological structure around the borehole can be generated according to the optical image and the trajectory data. Further, low-frequency acoustic wave data and high-frequency acoustic wave data of the geological structure around the borehole are obtained. And a full waveform inversion on the first velocity model is performed according to the low-frequency acoustic wave data and the high-frequency acoustic wave data to obtain a second velocity model of the geological structure around the borehole. Finally, the geological structure around the borehole can be determined according to the second velocity model. In this way, a multi-scale refined imaging on geological developments in a certain range around the borehole can be performed.

Compared with the traditional surface geophysical survey methods, the detection in the borehole is more directly close to the target, the environment in the borehole is relatively simple, and the interference of the shallow surface is less. On the basis that a drilling is indispensable, the effect of a single borehole is effectively expanded, and geological conditions within a radius of 15 meters around the borehole can be imaged within a single borehole.

Furthermore, with the technical solution provided by examples of the present disclosure, compared with single optical imaging and acoustic imaging, the results of optical imaging and borehole trajectory measurement can be effectively used to provide a better initial simulation for the inversion of acoustic wave data, the local optimal solution problem of inversion can be effectively avoided, and the accuracy and reliability of acoustic inversion can be improved. Moreover, multi-scale and different resolution imaging of borehole walls, rocks near to the borehole and rocks far from the borehole can all be realized.

In addition, with the solution provided by examples of the present disclosure, the inversion of low-frequency acoustic wave data may provide a better initial model for the inversion of high-frequency acoustic wave data than for single frequency borehole sonic data. While the inversion of high-frequency acoustic wave data may provide a better near borehole refinement model for the inversion of low-frequency acoustic wave data, and such frequency-space iterations may provide better accuracy and reliability for the inversion of borehole acoustic wave data.

Some examples of the present disclosure provide a multi-scale photoacoustic detection method of the geological structure around a borehole. The multi-scale photoacoustic detection method may be applied directly to a borehole detection device. Alternatively, data collection may be performed firstly by a borehole detection device. Then, the data collected may be transmitted to a computer. The computer may perform the multi-scale photoacoustic detection method for the geological structure around the borehole.

It should be noted that the method according to examples of the present disclosure may be performed by a single device, such as a computer or server. Moreover, the method according to examples of the present disclosure can also be applied to a distributed scenario, wherein the method can be implemented through cooperation of multiple devices. In the case of such a distributed scenario, one device of the plurality of devices may only perform one or more steps of the method, and the plurality of devices may interact with each other to perform the described method.

It is noted that some examples of the present disclosure have been described above. Other examples are within the scope of the following claims. In some cases, the acts or steps recited in the claims may be performed in a different order than in the examples described above and can still achieve desirable results. Additionally, the processes depicted in the accompanying drawings do not necessarily require the particular order shown, or sequential order, to achieve desirable results. In some examples, multi-tasking and parallel processing are also possible or may be advantageous.

Based on the multi-scale photoacoustic detection method of geological structure around a borehole, examples of the present disclosure also provide a multi-scale photoacoustic detection device of geological structure around a borehole.

Figure 9:
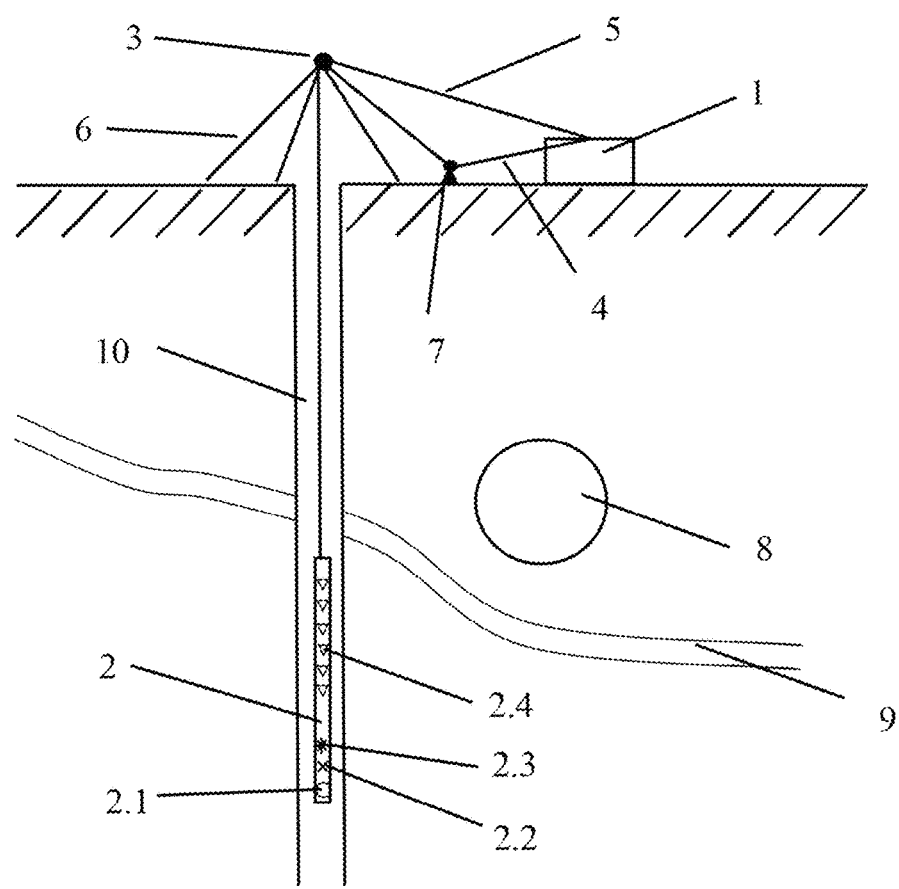
FIG. 9 is a schematic diagram illustrating a structure of a multi-scale photoacoustic detection device of geological structure around a borehole according to some examples of the present disclosure.

FIG. 9 is a schematic diagram illustrating a structure of the multi-scale photoacoustic detection device according to some examples of the present disclosure. As shown in FIG. 9, the device may include: a controller and a borehole probe 2. The borehole probe 2 may include a plurality of acoustic receiving transducers 2.4, arranged sequentially along an axial direction of the borehole probe.

The controller is configured to: obtain depth information and direction information of a borehole; generate trajectory data of the borehole according to the depth information and direction information; obtain an optical image of geological structure around the borehole; generate a first velocity model according to the optical image and the trajectory data; obtain low-frequency acoustic wave data and high-frequency acoustic wave data of the geological structure around the borehole; perform a full waveform inversion on the first velocity model according to the low-frequency acoustic wave data and the high-frequency acoustic wave data to obtain a second velocity model; and determine the geological structure around the borehole according to the second velocity model.

Figure 10:
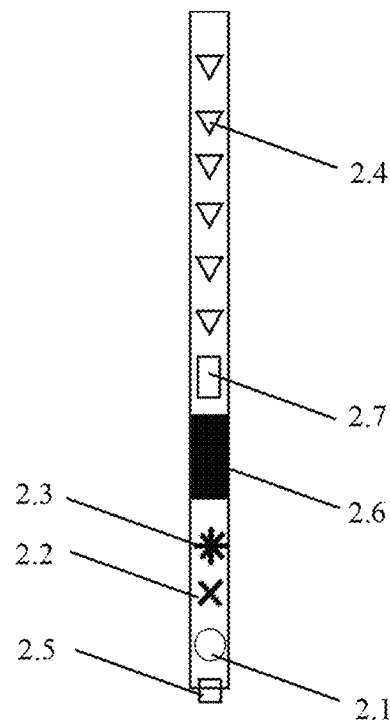
FIG. 10 is a schematic diagram illustrating a structure of a borehole probe according to some examples of the present disclosure.

FIG. 10 is a schematic diagram illustrating a structure of a borehole probe according to some examples of the present disclosure. As shown in FIG. 10, the borehole probe 2 may include a plurality of acoustic receiving transducers 2.4, arranged sequentially along an axial direction of the borehole probe. This arrangement ensures a dense coverage of the rays of the system, therefore, ensures the stability of the full waveform inversion.

In some examples of the present disclosure, the distance between the acoustic receiving transducers 2.4 and the high-frequency acoustic transmitting transducer 2.3 and the low-frequency acoustic transmitting transducer 2.2 should be as short as possible. In this way, the signal received by a near-end receiving transducer may be ensured to be close to the excited wavelet through short-distance transmission. Thus, wavelet estimation in the inversion process can be facilitated. In order to further shorten the distance between the acoustic receiving transducer 2.4 and the high-frequency acoustic transmitting transducer 2.3 and the low-frequency acoustic transmitting transducer 2.2, a three-dimensional electronic compass 2.7 may be arranged above the low-frequency acoustic transmitting transducer 2.2 or below the acoustic receiving transducer 2.4.

It can be seen that the technical solution provided by examples of the present disclosure adopts multi-frequency excitation and multi-point array reception with a short transmission distance. The short transmission distance guarantees a better wavelet estimation effect on the premise of ensuring multi-channel set data acquisition, which provides the necessary advantages for high-precision full waveform inversion.

In addition, compared with the traditional borehole multi-frequency acoustic wave detection, a array-type reception method is adopted, and the array-type reception greatly improves the feasibility of full waveform refinement inversion. The traditional borehole multi-frequency acoustic wave test can only perform simple signal processing, but the single-transmitter and single-receiver data acquisition form using full waveform inversion is usually unstable.

In some examples, referring to FIG. 9 and FIG. 10, the device may further include a site host 1, a depth counter 3, a first communication cable 4 and a second communication cable 5.

Optionally, a controller is provided in the site host 1, and the site host 1 is connected to the borehole probe 2 via the first communication cable 4, the depth counter 3 and a wire rack 7. The depth counter 3 is connected to the site host 1 via the second communication cable 5. A tripod 6 is used to support the depth counter 3, the first communication cable 4 and the second communication cable 5.

The borehole probe 2 also includes a single chip microcomputer, a three-dimensional electronic compass 2.7, a high-definition digital camera 2.1, a sound blocker 2.6, a light source 2.5, a high-frequency acoustic wave emitting transducer 2.3, a low-frequency acoustic wave emitting transducer 2.2 and a borehole probe network interface. The depth counter 3 may record a length of retraction and release of the first communication cable 4 and cooperates with the three-dimensional electronic compass 2.7 in the borehole probe 2 to generate the trajectory data. The borehole probe network interface in the borehole probe 2 is connected to the communication cable 4 and is responsible for transmitting data and field host commands. The single-chip microcomputer in the borehole probe may communicate with the three-dimensional electronic compass 2.7, the high-definition digital camera 2.1, the light source 2.5 and the borehole probe network interface. The single-chip microcomputer may control excitations of the high-frequency acoustic wave transmitting transducer 2.3 and the low-frequency acoustic wave transmitting transducer 2.2 respectively, and pre-process signals received by the acoustic receiving transducer 2.4. The borehole probe 2 is used for photo-acoustic fusion detection of a poor geological body cavern 8 or a rock fracture 9 around a borehole 10.

For convenience of description, the above device is described with functions divided into various modules, respectively. Of course, the functionality of the various modules may be implemented in one or multiple pieces of software and/or hardware in practicing the present disclosure.

The multi-scale photoacoustic detection device described above is used to implement the multi-scale photoacoustic detection method of geological structure around a borehole according to any of the examples described above, and has the beneficial effects of the corresponding methods.

Examples of the present disclosure also provides an electronic device, which includes a memory, a processor, and a computer program stored in the memory and executable on the processor, wherein the processor executes the program to implement the multi-scale photoacoustic detection method.

Figure 11:
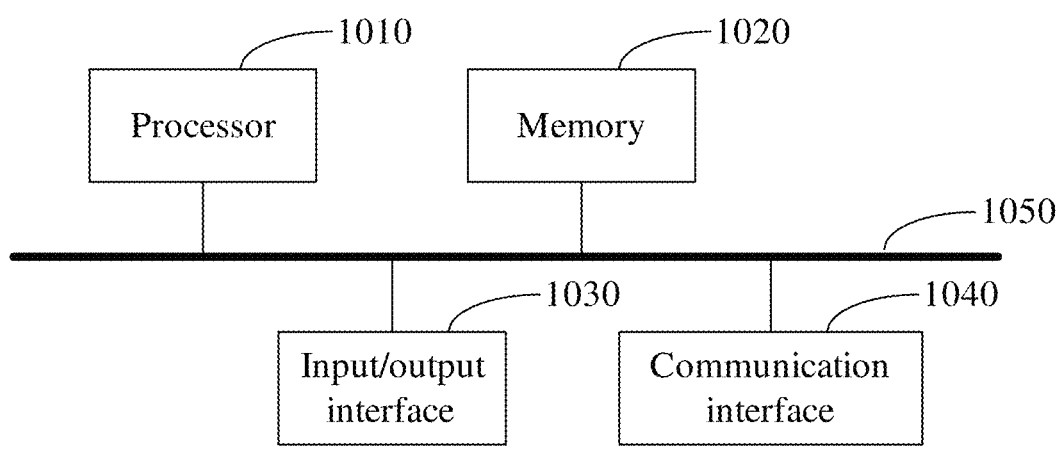
FIG. 11 is a schematic diagram illustrating a structure of an electronic device according to some examples of the present disclosure.

FIG. 11 is a schematic diagram illustrating a structure of an electronic device according to some examples of the present disclosure. As shown in FIG. 11, the electronic device may include: a processor 1010, a memory 1020, an input/output interface 1030, a communication interface 1040, and a bus 1050. The processor 1010, the memory 1020, the input/output interface 1030, and the communication interface 1040 may couple to each other via the bus 1050.

The processor 1010 may execute the relevant procedures by virtue of a general central processing unit (CPU), a microprocessor, an application specific integrated circuit (ASIC), or one or more integrated circuits, so as to implement the technical solution provided by the examples of the description.

The memory 1020 may be implemented by a read only memory (ROM), a random-access memory (RAM), a static memory device and a dynamic memory device, etc. The memory 1020 may store an operating system and other application procedures; when the technical solution provided by the example of the Description is implemented via the software or the hardware, the related procedure codes are stored in the memory 1020 and revoked by the processor 1010.

The I/O interface 1030 is used for connecting an I/O unit to realize information input and output. The I/O unit may be configured in the device (not in the figure) as a component configuration, and may be externally connected to the device to provide the corresponding functions. The input device may include keyboard, mouse, touch screen, microphone and various sensors. The output device may include display, loudspeaker, vibrator and indicator lamp.

A communication interface 1040 is used for connecting a communication unit (not shown in the figure) to realize communication interaction between the device and other devices. The communication unit may realize communication in a wired manner (for example, USB, wire, etc.) or in a wireless manner (for example, mobile network, WIFI, Bluetooth, etc.).

The bus 1050 includes a passage which transmits information among various components (for example, the processor 1010, the memory 1020, the I/O interface 1030 and the communication interface 1040) on the device.

It should be noted that, although the above-mentioned device merely shows the processor 1010, the memory 1020, the I/O interface 1030, the communication interface 1040 and the bus 1050, the device may further include other components required by the normal operation in the specific implementation process. Besides, those skilled in the art could appreciate that the above-mentioned device may merely include the components required by the solution in the examples of the Description, but not necessarily include all components shown in the figure.

The electronic device according to the foregoing examples is used for implementing the corresponding multi-scale photoacoustic detection method in any one of the foregoing examples, and has the beneficial effects of the corresponding method examples, which are not repeated in detail.

The flowcharts and block diagrams in the drawings illustrate the system architecture, functionality, and operation possibly implemented by systems, methods and computer program products according to various examples of the present invention. In this regard, each block in the flowcharts or block diagrams may represent a unit, program segment, or portion of code, which comprises one or more executable instructions for implementing the specified logical function(s). It should also be also noted that, in some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved. It should also be also noted that each block and combination of blocks in the flowcharts or block diagrams can be implemented by special purpose hardware-based systems which perform the specified functions or steps, or combinations of special purpose hardware and computer instructions.

The units or units involved in the examples of the present disclosure may be implemented by means of software or programmable hardware. The depicted units or units may be also arranged in the processor, and the titles of these units or units do not constitute the definition thereof in some cases.

Based on the same inventive concept, corresponding to the methods according to any one of the foregoing examples, the present disclosure further provides a non-transient computer readable storage medium which stores a computer instruction used for enabling the computer to perform the multi-scale photoacoustic detection method of geological structure around a borehole according to any one of the examples.

The computer readable medium in the example includes volatile, non-volatile, movable and non-movable media, which can realize information storage by any method or technology. The information can be computer readable instruction, data structure, program unit or other data. The example of computer storage media includes, but not limited to phase-change memory (PRAM), static random access memory (SRAM), dynamic random access memory (DRAM), other types of random access memory (RAM), read only memory (ROM), electrically erasable programmable read-only memory (EEPROM), flash memory or other memory technologies, compact disk read only memory (CD-ROM), digital versatile disc (DVD) or other optical memories, cassette magnetic tape, tape, disk memory or other magnetic memory device or any other non-transmission media, and available for storing information accessible by the computing devices.

The computer instruction stored by the storage medium according to the foregoing examples is used for enabling the computer to perform the multi-scale photoacoustic detection method of geological structure around a borehole according to any one of the examples, and has the beneficial effects of the corresponding method examples, which are not repeated in detail.

Those of ordinary skill in the art should appreciate that the discussion on any one of the foregoing examples is merely exemplary, but is not intended to imply that the scope of the present disclosure (including the claims) is limited to these examples. Under the idea of the present disclosure, the technical features of the foregoing examples or different examples may be combined, the steps may be implemented in any order, and there are many other variations in different aspects of the examples of the present disclosure, all of which are not provided in detail for simplicity.

Besides, for the sake of simplifying description and discussion and not making the examples of the present disclosure difficult to understand, the provided drawings may show or not show the public power supply/earthing connection to an integrated circuit (IC) chip and other parts. Besides, the device may be shown in block diagram form to prevent the examples of the present disclosure from being difficult, and moreover, this considers the following facts, that is, the details of the implementations with regard to the devices in these block diagrams highly depend on the platform which will implement the examples of the present disclosure (that is, these details should be completely within the scope understood by those skilled in the art). Where specific details (e.g. circuits) are set forth in order to describe exemplary examples of the present disclosure, it should be apparent to those skilled in the art that the examples of the present disclosure can be practiced without, or with variation of, these specific details. Therefore, these descriptions shall be considered to be illustrative instead of restrictive thereto.

While the present disclosure has been described in conjunction with specific examples thereof, many alternatives, modifications and variations of such examples will be apparent to those of ordinary skill in the art in light of the foregoing description. For example, other memory architectures, such as dynamic RAM (DRAM), may use the examples discussed.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:

1. A multi-scale photoacoustic detection method of geological structure around a borehole, comprising:
obtaining depth information and direction information of the borehole;
generating trajectory data of the borehole according to the depth information and direction information;
obtaining an optical image of the geological structure around the borehole;
generating a first velocity model according to the optical image and the trajectory data;
obtaining low-frequency acoustic wave data and high-frequency acoustic wave data of the geological structure around the borehole;
performing a full waveform inversion on the first velocity model according to the low-frequency acoustic wave data and the high-frequency acoustic wave data to obtain a second velocity model; and
determining the geological structure around the borehole according to the second velocity model.

2. The method of claim 1, wherein generating a first velocity model comprises:
analyzing properties of the geological structure around the borehole to determine formations of the geological structure around the borehole;
estimating a velocity of an acoustic wave propagating in each of the formations according to a pre-set relationship between the formations and the velocities of an acoustic wave propagating in the formations; and
constructing the first velocity model corresponding to the geological structure around the borehole based on the velocity of the acoustic wave propagating in each of the formations and the trajectory data of the borehole.

3. The method of claim 1, wherein performing a full waveform inversion on the first velocity model comprises:
performing a full waveform inversion on the first velocity model based on the low-frequency acoustic wave data to obtain a third velocity model; and
performing a full waveform inversion on the third velocity model based on the high-frequency acoustic wave data to obtain the second velocity model.

4. The method of claim 3, further comprising:
after performing the full waveform inversion on the third velocity model, determining whether a residual value between the third velocity model and the second velocity model is greater than a pre-set threshold,
in response to determining the residual value between the third velocity model and the second velocity model is greater than the pre-set threshold, updating the first velocity model based on the second velocity model and returning to the step of performing a full waveform inversion on the first velocity model based on the low-frequency acoustic wave data; and
in response to determining the residual value between the third velocity model and the second velocity model is not greater than the pre-set threshold, terminating the process.

5. The method of claim 4, wherein, updating the first velocity model based on the second velocity model comprises:

replacing a portion of the first velocity model whose detection range coincides with the detection range of the second velocity model; and
remaining other portions of the first velocity model unchanged.

6. The method of claim 3, wherein, performing a full waveform inversion on the first velocity model based on the low-frequency acoustic wave data to obtain a third velocity model comprises:
performing a full waveform inversion on the first velocity model based on the low-frequency acoustic wave data through a preset envelope object function to obtain a first pre-estimated velocity model; and
performing a full waveform inversion on the first pre-estimated velocity model based on the low-frequency acoustic wave data through a pre-set cross-correlation objective function to obtain the third velocity model.

7. The method of claim 6, wherein, performing a full waveform inversion on the first velocity model based on the low-frequency acoustic wave data through a preset envelope object function to obtain a first pre-estimated velocity model comprises:
obtaining an envelope of a simulated acoustic wave signal in the first velocity model;
obtaining an envelope of the low-frequency acoustic wave data;
performing the full waveform inversion on the first velocity model according to the envelope of the simulated acoustic wave signal and the envelope of the low-frequency acoustic wave detection data through the preset envelope target function to obtain the first pre-estimated speed model.

8. The method of claim 3, wherein, performing a full waveform inversion on the first velocity model based on the low-frequency acoustic wave data to obtain a third velocity model comprises:
selecting acoustic wave data within a first pre-set low-frequency range from the low-frequency acoustic wave data;
performing a full waveform inversion on the first velocity model based on the acoustic wave data within the first pre-set low-frequency range;
updating the first velocity model based on the inversion result;
enlarging the first pre-set low-frequency range;
selecting acoustic wave data within the first pre-set low-frequency range from the low-frequency acoustic wave data; and
returning to the step of performing a full waveform inversion on the first velocity model based on the acoustic wave data within the first pre-set low-frequency range.

9. The method of claim 8, wherein, performing a full waveform inversion on the first velocity model based on the acoustic wave data within the first pre-set low-frequency range comprises:
obtaining an envelope of a simulated acoustic wave signal in the first velocity model;
obtaining an envelope of the low-frequency acoustic wave data within the first pre-set low-frequency range;
performing the full waveform inversion on the first velocity model according to the envelope of the simulated acoustic wave signal and the envelope of the low-frequency acoustic wave detection data through the preset envelope target function to obtain the first pre-estimated speed model.

10. The method of claim 6, wherein the preset envelope objective function is:

$$E = \frac{1}{2}\sum_{s,r}\int_0^T [e(x_s, x_r, t) - e_0(x_s, x_r, t)]^2 dt$$

wherein, $e(x_s, x_r, t)$ represents an envelope of a simulated acoustic wave signal; $e_0(x_s, x_r, t)$ indicates an envelope of the low-frequency acoustic wave data or the high-frequency acoustic wave data.

11. The method of claim 6, wherein the preset cross-correlation objective function is:

$$E = \sum_{s,r}\int_0^T [-\frac{u(x_s, x_r, t)}{|u(x_s, x_r, t)|} \cdot \frac{u_0(x_s, x_r, t)}{|u_0(x_s, x_r, t)|}] dt$$

wherein, $u(x_s, x_r, t)$ represents a simulated acoustic wave signal; and $u_0(x_s, x_r, t)$ represents the low-frequency acoustic wave data or the high-frequency acoustic wave data.

12. The method of claim 3, wherein performing a full waveform inversion on the third velocity model based on the high-frequency acoustic wave data to obtain the second velocity model comprises:
performing a full waveform inversion on the third velocity model based on the high-frequency acoustic wave data through a preset envelope object function to obtain a second pre-estimated velocity model; and
performing a full waveform inversion on the second pre-estimated velocity model based on the high-frequency acoustic wave data through a pre-set cross-correlation objective function to obtain the second velocity model.

13. The method of claim 12, wherein, performing a full waveform inversion on the third velocity model based on the high-frequency acoustic wave data through the preset envelope object function to obtain a second pre-estimated velocity model comprises:
obtaining an envelope of a simulated acoustic wave signal in the third velocity model;
obtaining an envelope of the high-frequency acoustic wave data;
performing the full waveform inversion on the third velocity model according to the envelope of the simulated acoustic wave signal and the envelope of the high-frequency acoustic wave detection data through the preset envelope target function to obtain the second pre-estimated speed model.

14. The method of claim 3, wherein performing a full waveform inversion on the third velocity model based on the high-frequency acoustic wave data to obtain the second velocity model comprises:
selecting acoustic wave data within a second pre-set low-frequency range from the high-frequency acoustic wave data;
performing a full waveform inversion on the third velocity model based on the acoustic wave data within the second pre-set low-frequency range;
updating the third velocity model based on the inversion result;
enlarging the second pre-set low-frequency range;
selecting acoustic wave data within the second pre-set low-frequency range from the high-frequency acoustic wave data; and
returning to the step of performing a full waveform inversion on the third velocity model based on the acoustic wave data within the second pre-set low-frequency range.

15. The method of claim 14, wherein, performing a full waveform inversion on the third velocity model based on the acoustic wave data within the second pre-set low-frequency range comprises:
obtaining an envelope of a simulated acoustic wave signal in the third velocity model;
obtaining an envelope of the high-frequency acoustic wave data within the second pre-set low-frequency range;
performing the full waveform inversion on the third velocity model according to the envelope of the simulated acoustic wave signal and the envelope of the high-frequency acoustic wave detection data through the preset envelope target function to obtain the second pre-estimated speed model.

16. The method of claim 12, wherein the preset envelope objective function is:

$$E = \frac{1}{2}\sum_{s,r}\int_0^T [e(x_s, x_r, t) - e_0(x_s, x_r, t)]^2 dt$$

wherein, $e(x_s, x_r, t)$ represents an envelope of a simulated acoustic wave signal; $e_0(x_s, x_r, t)$ indicates an envelope of the low-frequency acoustic wave data or the high-frequency acoustic wave data.

17. The method of claim 12, wherein the preset cross-correlation objective function is:

$$E = \sum_{s,r}\int_0^T [-\frac{u(x_s, x_r, t)}{|u(x_s, x_r, t)|} \cdot \frac{u_0(x_s, x_r, t)}{|u_0(x_s, x_r, t)|}] dt$$

wherein, $u(x_s, x_r, t)$ represents a simulated acoustic wave signal; and $u_0(x_s, x_r, t)$ represents the low-frequency acoustic wave data or the high-frequency acoustic wave data.

18. A multi-scale photoacoustic detection device of geological structure around a borehole, comprising:
a controller and a borehole probe; wherein,
the borehole probe comprises a plurality of acoustic receiving transducers, arranged sequentially along an axial direction of the borehole probe;
the controller is configured to:
obtain depth information and direction information of the borehole;
generate trajectory data of the borehole according to the depth information and direction information;
obtain an optical image of the geological structure around the borehole;
generate a first velocity model according to the optical image and the trajectory data;
obtain low-frequency acoustic wave data and high-frequency acoustic wave data of the geological structure around the borehole;
perform a full waveform inversion on the first velocity model according to the low-frequency acoustic wave data and the high-frequency acoustic wave data to obtain a second velocity model; and determine the geological structure around the borehole according to the second velocity model.

19. A non-transitory computer-readable storage medium, wherein the non-transitory computer-readable storage medium stores computer instructions, and the computer instructions are used to make a computer execute the method according to claim 1.

* * * * *